Jan. 8, 1935.   E. SCHULTE   1,987,494
EMERGENCY TIRE FOR AUTOMOTIVE VEHICLES
Filed Nov. 2, 1933   3 Sheets-Sheet 1
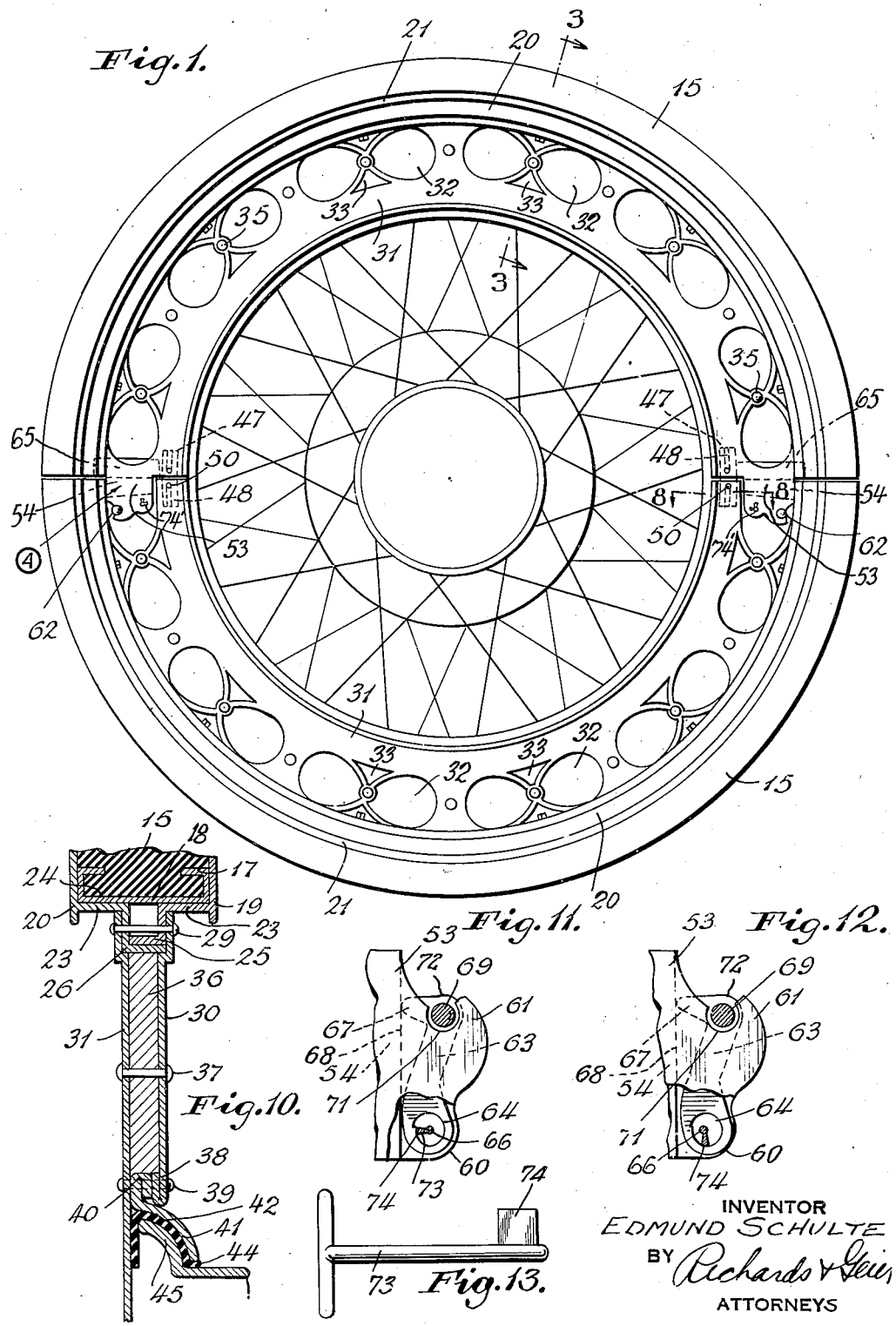

Jan. 8, 1935.  E. SCHULTE  1,987,494
EMERGENCY TIRE FOR AUTOMOTIVE VEHICLES
Filed Nov. 2, 1933   3 Sheets-Sheet 2
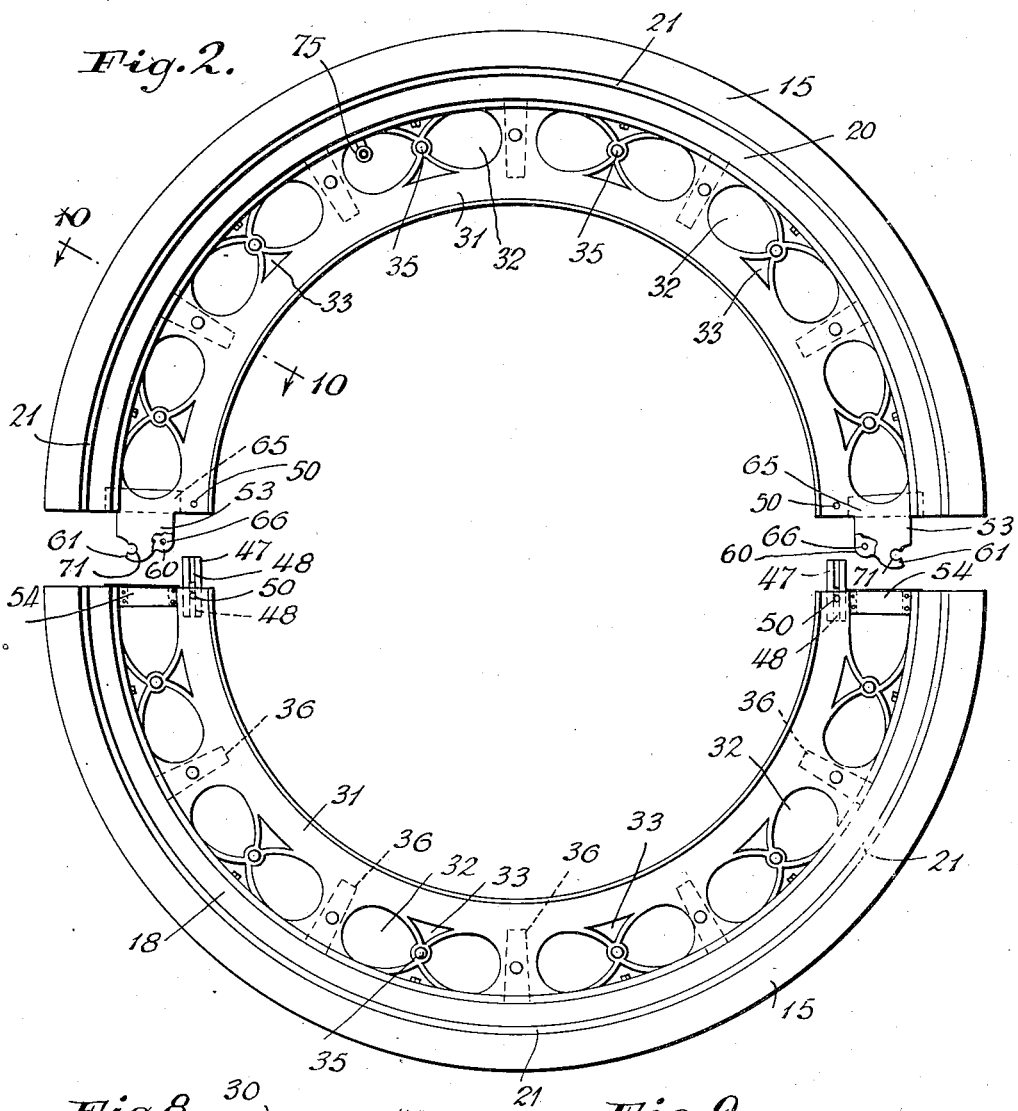

Jan. 8, 1935. E. SCHULTE 1,987,494
EMERGENCY TIRE FOR AUTOMOTIVE VEHICLES
Filed Nov. 2, 1933 3 Sheets-Sheet 3
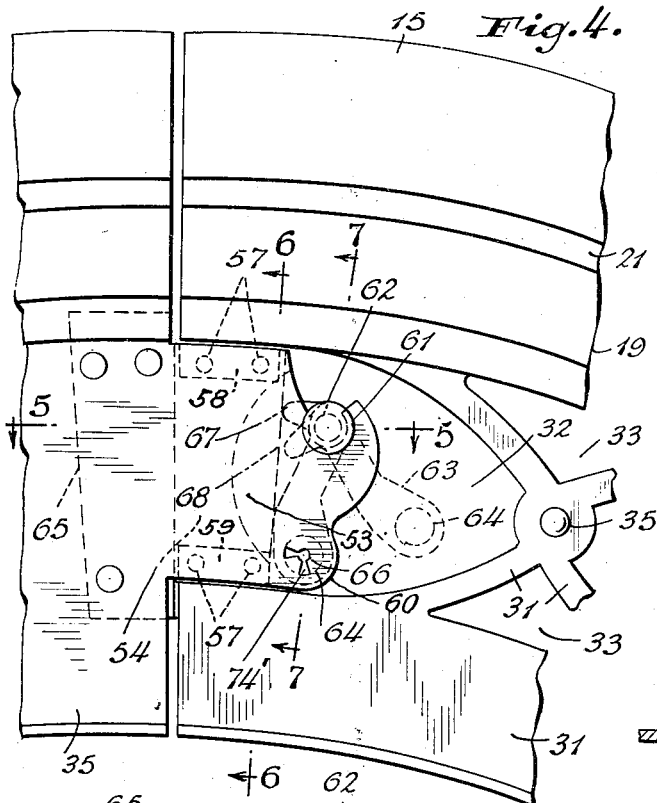
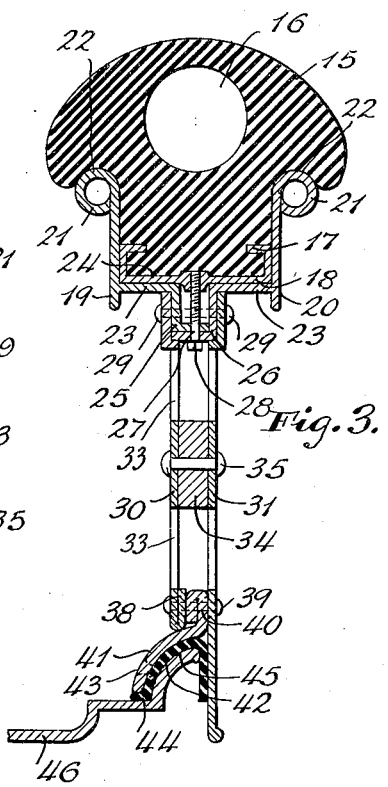
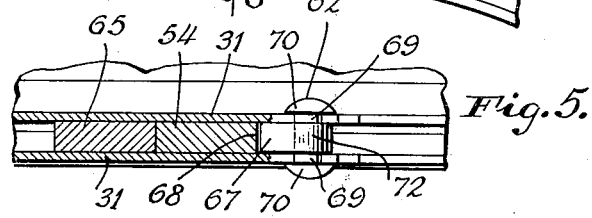
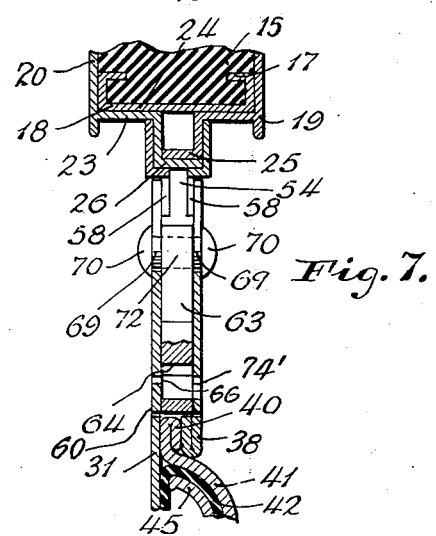
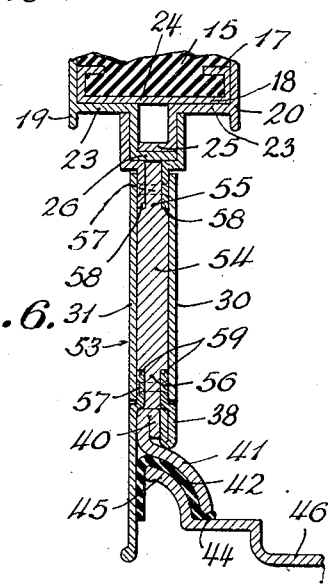
INVENTOR
EDMUND SCHULTE
BY Richards & Geier
ATTORNEYS Patented Jan. 8, 1935

1,987,494

UNITED STATES PATENT OFFICE 1,987,494

EMERGENCY TIRE FOR AUTOMOTIVE VEHICLES

Edmund Schulte, Bronxville, N. Y., assignor of one-fifth to Alexander H. McLanahan, New York, N. Y., and one-fifth to George W. Dusenbury, Bronxville, N. Y.

Application November 2, 1933, Serial No. 696,323

5 Claims. (Cl. 301—39)

The present invention relates to an emergency tire for vehicles and it particularly relates to an emergency tire which may be applied to automobiles and similar vehicles so that they may be driven without injury to the nearest garage or station, where repairs may be made.

In a case of a blowout or flat tire it is usually necessary for the owner of the car either to replace the tire immediately or to drive the car to the nearest place where a flat tire may be repaired or a new tire may be supplied.

The former procedure is frequently impossible because of the fact that the blowout or flat tire has occurred on a crowded road where it is not convenient to stop the car for extended periods to make suitable repairs or replacements or it may not be feasible because the car is not equipped with satisfactory spare tires. In addition the driver of the car may be so dressed, or be undesirous for other reasons of engaging in the task of jacking up the car and replacing the tire, particularly because of the expenditure of time, the considerable labor involved and the resultant soiling of the hands and clothes in performing this task.

On the other hand, the second procedure is not advisable because extended driving upon a flat tire will seriously injure both the tire and also the wheel structure and in addition prevent satisfactory driving and necessitate very slow progress.

An object of the present invention is, therefore, to provide an emergency tire of relatively light weight and of small expense which may be most conveniently attached to the wheel of an automobile or other vehicle having a flat tire or blowout without the necessity of using jacks and without undue expenditure of time and labor, said emergency tire after attachment enabling the car to be driven to the nearest garage or a repair station where the blowout or flat tire may be fixed or replaced.

Other objects will appear during the course of the following specification.

In accomplishing the above objects an emergency tire construction is provided which may be conveniently connected to the vehicle and which preferably is made in a plurality of sections which may be applied and readily clamped together by the driver of the car without difficulty.

The above and other objects will appear more clearly from the following detailed description, when taken in connection with the accompanying drawings, which illustrate an embodiment of the inventive idea.

In the drawings:

Figure 1 is a side view of the assembled emergency tire construction applied to the wheel of an automotive vehicle.

Figure 2 is a side view of the separated sections of the emergency tire construction before application to the wheel of the vehicle.

Figure 3 is a side sectional view upon an enlarged scale upon the line 3—3 of Figure 1.

Figure 4 is an enlarged detail side view of the locking arrangement for attaching together the sections of the emergency tire construction indicated at 4 in Figure 1.

Figure 5 is a top sectional view of the locking device upon an enlarged scale along the line 5—5 of Figure 4.

Figures 6 and 7 are enlarged sectional views of the locking device upon the lines 6—6 and 7—7 of Figure 4.

Figures 8 and 9 illustrate the wedging device for holding one of the sections of the tire in position upon rolling over of the wheel before attachment of the other section, Figure 8 being a side sectional view upon the line 8—8 of Figure 1 and Figure 9 being a perspective view of the locking wedge, both upon an enlarged scale.

Figure 10 is a sectional view upon the line 10—10 of Figure 2 illustrating the construction of the emergency tire, and Figures 11 and 12 diagrammatically illustrate how the locking device shown in Figure 4 may be conveniently manipulated into locked position by an auxiliary key.

Figure 13 is a side view of the auxiliary or secondary key upon an enlarged scale.

Referring to Figure 3 (and also Figures 1 and 2) the emergency tire construction has a tire element 15 of rubber which may be provided with a central annular opening 16 to receive air under pressure. The rubber tire structure 15 is held by the inturned flanges 17 of the channel member 18 and is clamped between the bracket members 19 and 20. The upper portions of the bracket members have rolled portions 21 which press inwardly on the tire 15, as indicated at 22.

The lower flanges 23 (see Figure 3) of the bracket members 19 and 20 receive the web 24 of the channel member 18 and these flanges are provided with the depending L-shaped extensions 25 and 26, which fit closely into each other and are connected together and to the web 24 of the channel member 18 by the bolt 27 and the nut 28, said bolt 27 screwing into a boss at the bottom of said web 24.

To the sides of the L-portions 25 and 26 of the brackets 19 and 20 are riveted at 29 the annular side plates 30 and 31 of the emergency tire structure (see Figure 3). Portions of these annular side plates 30 and 31 are cut away as indicated at 32 and 33 to give an artistic appearance (see also Figures 1, 2 and 4). At intervals the side plates 30 and 31 are provided with the spacer blocks 34 and 36 which are riveted at 35 and at 37 respectively, to the side plates 30 and 31 (see also Figure 10).

The inner edge of the side plate 30 is turned inwardly as indicated at 38 (see Figures 3, 6, 7, 8 and 10) and between it and the lower portion of the side plate 31 is riveted at 39 the rebent portion 40 of the rim gripping element 41. The rim gripping portion 41 is provided on its concave face with a rubber surfacing or flexible pad 42 which may be riveted or otherwise permanently attached thereto, as indicated at 43 (see Figure 3), such rubber or flexible pad 42 extending under the edge of the engaging portion 41 as indicated at 44. The pad 42 is compressed upon attachment of the emergency tire between the rim engaging portion 41 and the rim extension 45, the main body of the usual automobile rim being shown at 46 in Figures 3 and 6.

Upon connection of one of the half or semicircular sections of the annular emergency tire to the wheel by insertion of the rim engaging portion 41 inside of the rim extension 45, the car is then rolled around 180° until it is supported upon such half of the emergency tire.

To prevent this half section from falling out of position while the car is being rolled about, a wedge as shown in Figure 9 is inserted (as indicated in Figures 1, 2 and 8).

This wedge consists of a quarter cylinder section 47 having the slots 48 extending partly in from each end 49 to receive the studs 50 (see Figure 8) extending inwardly from the lower edge of the side plate 31.

As indicated in Figures 2 and 8 the curved face 51 of the locking wedge 47 fits inside and wedges against the curved surface 52 of the rim extension 45, the part 42 being in part removed to permit accommodation of the wedge (see particularly Figure 8). The wedge is held in position by the stud pin 50 fitting in the slot 48.

It will be noted in Figure 2 that a wedge is inserted in each side of the emergency tire and these wedges 47 will hold the emergency tire firmly in position when the wheel is being turned over so that the other half section may be attached.

The locking wedge 47 may be made of a rubber material, of wood or other materials and its wedging action may be due to its own resiliency, as well as the resiliency of the enclosure between the walls of the enclosure which include the rim extension 45 and the extension of the side plate 31. The wedging action is due to the insertion of the straight bar 47 into the slightly curved recesses between the rim extension 45 and the extension of the side plate 31.

These wedges are adapted to remain in position (as indicated in Figure 1) after the upper section has been placed in position and has been locked to the lower section (see also Figure 2).

The locking device is shown before connection in small scale in Figure 2 and after connection in Figure 1 and its detailed construction is indicated in Figures 4, 5, 6 and 7 and also in Figures 11 and 12. The locking device consists of cooperating spaced extensions 53 on the ends of the side plates 30 and 31 of the upper section as shown in Figures 1 and 2, between which is received the plate 54. The plate 54 is best shown in Figure 6 and it is provided with the end portions 55 and 56 of reduced thickness, which are riveted at 57 to the extensions 58 and 59 of the side plates 30 and 31.

As shown in detail in Figures 4 and 5, the extensions 53 have key lugs 60 and pivot lugs 61, the pivot lugs 61 receiving the pivotal studs 62 of the main keys 63. The other end of the main key 63 is provided with an opening 64 which is adapted to be received inside of the key openings 74' (see Fig. 1) in the lugs 60 on one side. The opposite key lugs 60 each have a central opening 66 to receive the end of the stem of a secondary key, enabling the main key 63 to be swung into locking position with its nose 67 pressed against the edge 68 of the plate 54, as best shown in Figure 4.

The pivot connection 62 of the main key 63 is provided with the two contact portions 69 (see Figures 5 and 7) inside of the rounded heads 70 which fit in the curved recesses 71 (see Figure 2) inside of the hooks 61 of the plates 53. The hub 72 of the main key 63 enables correct positioning of said pivotal portions 69 in said openings 71.

Referring to Figures 11 and 12 the secondary key 73 (see also Fig. 13) shown has a lateral extension 74 which fits into correspondingly shaped openings 74' in one of the key lugs 60. One of the openings 74' (shown in Fig. 1) enables insertion of the key with its extension as shown in Fig. 12 and the other enables withdrawal after a quarter turn of the key as shown in Fig. 11. It also has a stem which rides in the openings 66 in the other ear lug 60. By the secondary key 73 the nose 67 of the main key may be forced into locking position as shown in Figure 4. It will be noted that the opening 64 is of cam shape so as to cooperate with the extension of the key 73.

The key 73 as shown in Fig. 13 may be conveniently removed from the assembly and carried on a key ring or about the automobile. It may be connected by a chain if desired to one of the emergency tire sections.

The opening 16 in the tire may be conveniently inflated by any sort of a stem arrangement as for example by a valve stem 75, see Figure 2.

In operation the lower half section as indicated in Figures 1 and 2 may be inserted in the upper half of the rim extension 45 by the rim locking member 41. The rubber lining 42 of said rim locking member 41 assures a fairly firm connection.

Then the wedges 47 are inserted in position and the car or automobile is rolled until the attached half section of the emergency tire is in the position shown in Figures 1 and 2. Then the other half section is inserted in the remaining portion of the rim extension 45 and the plates 53 are telescoped upon the plate 54 on the lower half section. The hook members 61 of the plates 53 will then project beyond the plates 54. The main key 63 may then be conveniently inserted with its pivot portions 69 resting in the recesses 71 of said extensions 53.

The key 63 may be moved partly home to lock its nose 67 against the edge 68 of the plate 54, and thereupon the secondary key 73 may be inserted through an opening 74' to force the nose 67 altogether home against the edge 68 of said plate 54. The secondary key 73 serves to force the nose 67 in its movement from the position of Fig. 12 to the position of Fig. 11 across the place of minimum spacing between the pivotal contact portion 69 and the edge 68 of the plate 54, so that in the position of Fig. 11 the key 63 will be securely wedged into position with both the nose 67 and the lower portion thereof in contact with the edge 68 of the plate 54. The wedge members 47 will be firmly held in position as shown in Figure 1 and will assist the rigidity and firmness of the connection.

Then the automobile may be driven or rolled to the nearest repair station or garage where the flat may be fixed and a new tire provided if desired.

It will be noted that this change may be very conveniently made by the driver without the necessity of jacking up the car and without particularly soiling his clothing or engaging in any amount of labor. It may be then most expeditiously applied upon crowded roads. The car, when driven, after the attachment of the emergency tire will not rest upon the deflated tire and its rim or wheel structure, thus giving assurance that no injury thereto will result.

What is claimed is:

1. An emergency rim construction to be connected to a wheel of an automobile or similar vehicle having a deflated or flat tire, said emergency rim being readily connected without jacking up the vehicle and enabling the automobile to be driven to the nearest repair station or garage, said structure including a rubber tire element having substantially the same diameter as the tire of the automotive vehicle when inflated, spaced annular side plates provided with spacer blocks at intervals riveted to said plates, a rim engaging portion bolted between the inner edges of said side plates, a rubber facing on said rim engaging portion enabling close contact therebetween and the rim of the automotive vehicle, and a channel member for receiving the inner edge of said tire element connected to said side plates, said emergency rim structure being made of two semi-circular sections.

2. An emergency rim construction to be connected to a wheel of an automobile or similar vehicle having a deflated or flat tire, said emergency rim being readily connected without jacking up the vehicle and enabling the automobile to be driven to the nearest repair station or garage, said structure including, two complementary semi-circular annular sections interiorly provided with members to engage the rim of a vehicle wheel, semi-circular rubber tire elements carried on the peripheries of said sections and clamping means to hold said sections together on a vehicle wheel, said sections each comprising two spaced annular side plates provided with spacer blocks at intervals riveted to said plates, the inner edges of said side plates carrying said engaging members and the outer edges provided with a secondary rim structure for carrying said rubber tire elements.

3. An emergency rim construction to be connected to a wheel of an automobile or similar vehicle having a deflated or flat tire, said emergency rim being readily connected without jacking up the vehicle and enabling the automobile to be driven to the nearest repair station or garage, said structure including two complementary semi-circular annular sections interiorly provided with members to engage the rim of a vehicle wheel, semi-circular rubber tire elements carried on the peripheries of said sections and clamping means at the adjacent ends of said sections to hold said sections together on a vehicle wheel, each of said clamping means including two spaced plate members projecting beyond the end of one section, an intervening plate member carried by the adjacent end of the other section to be received between said plate members, said spaced plate members being provided with key receiving extensions extending beyond said plate member and key means to be received in said extensions to lock said spaced and intervening plate members together.

4. The combination with a vehicle wheel having a radially extending tire flange, of an emergency rim comprising two complementary semi-circular sections, each interiorly provided with a quarter circular lip and a radial extension forming a groove therebetween, the groove adapted to receive the tire flange, a quarter cylindrical bar adapted to be forced between said radial extension and said tire flange until the wheel can be rolled upon said section and the other section secured to the wheel and to said first-mentioned section.

5. The combination with a vehicle wheel having a radially extending tire flange, of an emergency rim comprising two complementary semi-circular sections, each interiorly provided with a flange engaging lip and an extension forming a groove therebetween, the groove adapted to receive the tire flange, a wedging bar adapted to be forced between said extension and said tire flange until the wheel can be rolled upon said section and the other section secured to the wheel and to said first-mentioned section.

EDMUND SCHULTE.